(12) United States Patent
Choi et al.

(10) Patent No.: US 12,039,277 B2
(45) Date of Patent: Jul. 16, 2024

(54) METHOD AND DEVICE WITH NATURAL LANGUAGE PROCESSING

(71) Applicant: Samsung Electronics Co., Ltd., Suwon-si (KR)

(72) Inventors: Inkyu Choi, Seoul (KR); Jehun Jeon, Suwon-si (KR); GyuBum Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 357 days.

(21) Appl. No.: 17/186,830

(22) Filed: Feb. 26, 2021

(65) Prior Publication Data

US 2022/0092266 A1 Mar. 24, 2022

(30) Foreign Application Priority Data

Sep. 23, 2020 (KR) .................. 10-2020-0122772

(51) Int. Cl.
| | |
|---|---|
| *G06F 17/00* | (2019.01) |
| *G06F 40/30* | (2020.01) |
| *G06N 3/08* | (2023.01) |
| *G06N 5/02* | (2023.01) |

(52) U.S. Cl.
CPC .............. *G06F 40/30* (2020.01); *G06N 3/08* (2013.01); *G06N 5/02* (2013.01)

(58) Field of Classification Search
CPC ............. G06F 40/30; G06N 3/08; G06N 5/02
USPC ............................................................ 704/9
See application file for complete search history.

(56) References Cited

U.S. PATENT DOCUMENTS

| | | | |
|---|---|---|---|
| 10,943,072 B1* | 3/2021 | Jaganmohan | .......... G06N 3/045 |
| 2004/0148154 A1 | 7/2004 | Acero et al. | |
| 2012/0029921 A1 | 2/2012 | Grant et al. | |
| 2017/0200077 A1 | 7/2017 | Weston et al. | |

(Continued)

FOREIGN PATENT DOCUMENTS

| | | |
|---|---|---|
| JP | 2018-84627 A | 5/2018 |
| KR | 10-2017-0057792 A | 5/2017 |
| KR | 10-2017-0098573 A | 8/2017 |

OTHER PUBLICATIONS

Peters, Matthew E., et al. "Knowledge enhanced contextual word representations." arXiv preprint arXiv:1909.04164 (Oct. 2019). (14 pages in English).

*Primary Examiner* — Paul C McCord
(74) *Attorney, Agent, or Firm* — NSIP Law

(57) ABSTRACT

A method and device with natural language processing is disclosed. The method includes performing a word embedding of an input sentence, encoding a result of the word embedding, using an encoder of a natural language processing model, to generate a context embedding vector, decoding the context embedding vector, using a decoder of the natural language processing model, to generate an output sentence corresponding to the input sentence, generating a score indicating a relationship between the context embedding vector and each of a plurality of knowledge embedding vectors, determining a first loss based on the output sentence, determining a second loss based on the generated score, and performing training of the natural language processing model, including training the natural language processing model based on the determined first loss, and training the natural language processing model based on the determined second loss.

17 Claims, 6 Drawing Sheets

(56) References Cited

U.S. PATENT DOCUMENTS

| | | |
|---|---|---|
| 2018/0300317 A1 | 10/2018 | Bradbury |
| 2019/0251104 A1 | 8/2019 | Branavan et al. |
| 2019/0370337 A1 | 12/2019 | Lee et al. |
| 2019/0370394 A1 | 12/2019 | Li et al. |
| 2020/0089765 A1 | 3/2020 | Jayaraman et al. |
| 2021/0104231 A1 | 4/2021 | Jeon et al. |
| 2022/0075953 A1* | 3/2022 | Khetan .................. G06N 3/084 |

* cited by examiner

METHOD AND DEVICE WITH NATURAL LANGUAGE PROCESSING

CROSS-REFERENCE TO RELATED APPLICATIONS

This application claims the benefit under 35 USC § 119(a) of Korean Patent Application No. 10-2020-0122772 filed on Sep. 23, 2020, in the Korean Intellectual Property Office, the entire disclosure of which is incorporated herein by reference for all purposes.

BACKGROUND

1. Field

The following description relates to a method and device with natural language processing.

2. Description of Related Art

An existing technology converts external knowledge information to an embedding vector and inputs the embedding vector to a neural network-based natural language processing model. In such a case, information of the input embedding vector may become transformed or lost as the inference operations proceed towards an upper layer of the language processing model. In addition, the size of an input of the natural language processing model is typically dependent on the size of the embedding vector, and thus parameter and computation quantities of the typical natural language processing models may increase as the size of the embedding vector increases.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes performing a word embedding of an input sentence, encoding a result of the word embedding, using an encoder of a natural language processing model, to generate a context embedding vector, decoding the context embedding vector, using a decoder of the natural language processing model, to generate an output sentence corresponding to the input sentence, generating a score indicating a relationship between the context embedding vector and each of a plurality of knowledge embedding vectors, determining a first loss based on the output sentence, determining a second loss based on the generated score, and performing training of the natural language processing model, including training the natural language processing model based on the determined first loss, and training the natural language processing model based on the determined second loss.

The generating of the score may include generating a first score indicating a relation between the context embedding vector and a first knowledge embedding vector, and generating a second score indicating a relation between the context embedding vector and a second knowledge embedding vector.

The first knowledge embedding vector may be a knowledge embedding vector that represents a true knowledge of the input sentence, and the second knowledge embedding vector may be a knowledge embedding vector that represents a false knowledge of the input sentence.

The training of the natural language processing model based on the second loss may include determining the second loss using a difference between the first score and the second score, and training the word embedding and the encoder based on the second loss.

The training of the word embedding and the encoder may be performed to decrease the second loss.

The generating of the first score may include generating a first concatenated vector by concatenating the context embedding vector and the first knowledge embedding vector, and generating the first score using the first concatenated vector and a score function, and the generating of the second score may include generating a second concatenated vector by concatenating the context embedding vector and the second knowledge embedding vector, and generating the second score using the second concatenated vector and the score function.

The score function may be a neural network having a plurality of fully-connected layers.

The training of the natural language processing model based on the second loss may include training the word embedding to include knowledge information associated with the input sentence in results of the word embedding, and training the encoder to include the knowledge information in context embedding vector results of the encoder.

The method may further include generating the knowledge embedding vectors using knowledge graph (KG) embedding.

The training of the natural language processing model based on the determined first loss may include training the word embedding, the encoder, and the decoder based on the first loss, and the training of the natural language processing model based on the determined second loss may include training the word embedding and the encoder based on the second loss.

In one general aspect, one or more embodiments include a non-transitory computer-readable storage medium storing instructions, which when executed by a processor, configure the processor to perform any one, or more, or all operations or methods set forth herein.

In one general aspect, a device includes a memory storing a natural language processing model, and a processor configured to perform a word embedding of an input sentence, encode a result of the word embedding, using an encoder of the natural language processing model, to generate a context embedding vector, decode the context embedding vector, using a decoder of the natural language processing model, to generate an output sentence corresponding to the input sentence, generate a score indicating a relationship between the context embedding vector and each of a plurality of knowledge embedding vectors, determine a first loss based on the output sentence, determine a second loss based on the generated score, and perform a training of the natural language processing model, including a training of the natural language processing model based on the determined first loss, and a training of the natural language processing model based on the determined second loss.

The processor may be configured to generate a first score indicating a relation between the context embedding vector and a first knowledge embedding vector, and generate a second score indicating a relation between the context embedding vector and a second knowledge embedding vector.

The first knowledge embedding vector may be a knowledge embedding vector that represents a true knowledge of the input sentence, and the second knowledge embedding vector may be a knowledge embedding vector that represents a false knowledge of the input sentence.

The processor may be configured to determine the second loss using a difference between the first score and the second score, train the word embedding and the encoder based on the second loss.

The processor may be configured to generate a first concatenated vector by concatenating the context embedding vector and the first knowledge embedding vector, and generate the first score using the first concatenated vector and a score function, and generate a second concatenated vector by concatenating the context embedding vector and the second knowledge embedding vector, and generate the second score using the second concatenated vector and the score function.

The score function may be a neural network having a plurality of fully-connected layers.

The processor may be configured to train the word embedding to include knowledge information associated with the input sentence results of the word embedding, and to train the encoder to include the knowledge information in context embedding vector results of the encoder.

The processor may be configured to generate the knowledge embedding vectors using knowledge graph (KG) embedding.

In one general aspect, a device includes a memory storing a natural language processing model, and a processor configured to perform word embedding on an input sentence, generate a context embedding vector by encoding a result of the word embedding using an encoder of the natural language processing model, generate an output sentence corresponding to the input sentence by decoding the context embedding vector using a decoder of the natural language processing model, where respective results of each of the word embedding and the generating of the context embedding vector include information of one or more words of the sentence and knowledge information associated with the input sentence.

In one general aspect, a device includes a processor configured to generate a context embedding vector by encoding, using an encoder of a natural language processing model, a result of an embedding of an input sentence, decode the context embedding vector using a decoder of the natural language processing model, and perform one or more operations of the device based on a result of the decoding of the context embedding vector, wherein the context embedding vector respectively represents knowledge information and context of the input sentence, and wherein the result of the embedding of the input sentence represents embedded one or more words of the input sentence and knowledge information of the one or more words of the input sentence.

The processor may be further configured to train the natural language processing model, including the processor being configured to perform a training word embedding of a training input sentence, encode a result of the training word embedding, using the encoder, to generate a training context embedding vector, decode the training context embedding vector, using the decoder, to generate a training output sentence corresponding to the training input sentence, where the training of the natural language processing model may include training the training word embedding and the encoder based on a determined loss corresponding to determined relationships between the training context embedding vector and each of a plurality of knowledge embedding vectors.

For the training of the natural language processing model, the processor may be further configured to determine an output loss based on the output sentence, and train at least the encoder and decoder based on the determined output loss, and determine the loss corresponding to the determined relationships based on a scoring of the relationships between the training context embedding vector and each of a plurality of knowledge embedding vectors.

For the scoring of the relationships, the processor may be configured to generate a first score, indicating a relation between the training context embedding vector and a first knowledge embedding vector, using a score function, and generate a second score, indicating a relation between the training context embedding vector and a second knowledge embedding vector, using the score function, and scoring the relationships dependent on the first score and the second score.

Other features and aspects will be apparent from the following detailed description, the drawings, and the claims.

Figure 1:
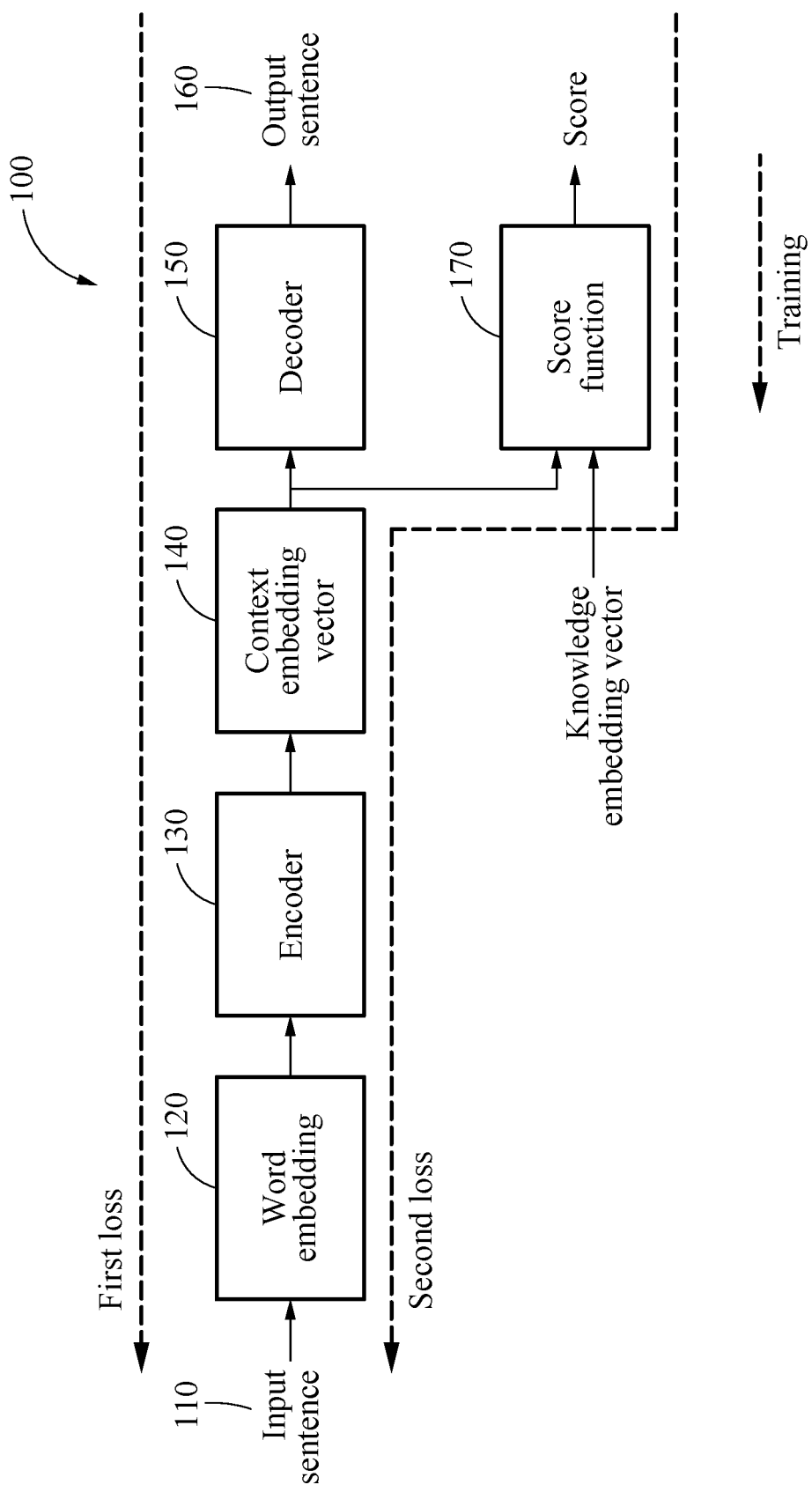
FIGS. 1 and 2 illustrate an example training of a natural language processing model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

Figure 2:
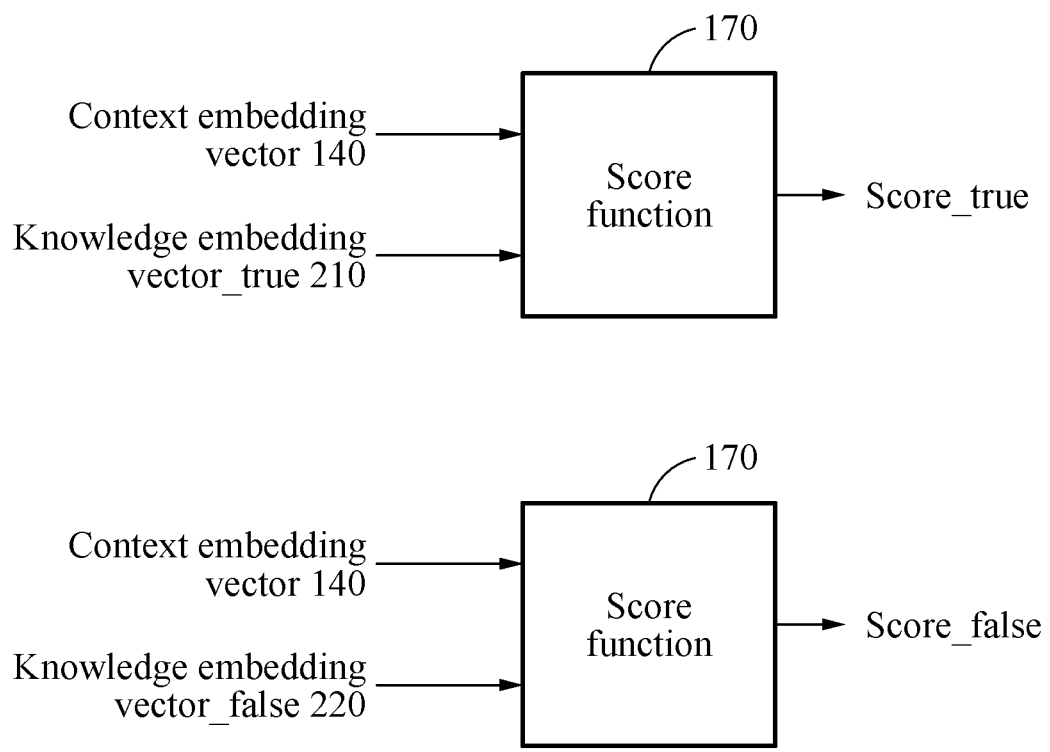

FIGS. 1 and 2 illustrate an example training of a natural language processing model.

Hereinafter, in accordance with one or more embodiments, a series of operations performed by a natural language processing model training device 100 to train a natural language processing model will be described with reference to FIGS. 1 and 2. The natural language processing model training device 100 as well as other devices described herein refer to a device training the natural language processing model, e.g., a device that performs training of the natural language processing model, a device that includes such training among other operations, as well as a method and device that includes such training and/or performs inference operations of the trained natural language processing model, among other operations and functions of the device, as non-limiting examples. References to a device are also intended to refer to a computing device, or a server device.

Referring to FIG. 1, the natural language processing model training device 100 may perform word embedding 120 on an input sentence 110. The input sentence 110 may include a plurality of tokens. A token described herein may correspond to a word or a phrase, but examples of which are not limited thereto.

Although it is illustrated in FIG. 1 that the natural language processing model training device 100 performs the word embedding 120 on the input sentence 110, the natural language processing model training device 100 may perform the word embedding 120 on a token.

For example, word2vec may be used as an example of a word embedding method, but examples of the word embedding method are not limited to word2vec.

Thus, the natural language processing model training device 100 may generate a word vector for each of multiple or all words in the input sentence 110 by performing the word embedding 120 on the input sentence 110. That is, the natural language processing model training device 100 may generate a plurality of word vectors through the word embedding 120. According to implementation, the natural language processing model training device 100 may generate a single sentence vector for the input sentence 110 through the word embedding 120.

The natural language processing model training device 100 may generate a context embedding vector 140 by encoding a result of the word embedding 120 through an encoder 130. Here, the result of the word embedding 120 may be the word vectors or the sentence vector described above. The context embedding vector 140 may include context information of the input sentence 110. In addition, the context embedding vector 140 may include knowledge information through training, which will be described in greater detail below.

The encoder 130 may be, for example, a recurrent neural network (RNN), a long short-term memory (LSTM) model, or a transformer, but examples of the encoder 130 implementation are not limited thereto.

The natural language processing model training device 100 may generate an output sentence 160 corresponding to the input sentence 110 by decoding the context embedding vector 140 through a decoder 150.

The decoder 150 may be, for example, an RNN, an LSTM model, or a transformer, but examples of the decoder 150 implementations are not limited thereto.

The natural language processing model training device 100 may determine or calculate a first loss by applying the output sentence 160 and a true sentence to a first loss function, for example the true sentence may be known or previously labeled. The first loss function may be, for example, a mean squared error (MSE)-based loss function, but examples of which are not limited thereto. In other words, the natural language processing model training device 100 may determine the first loss based on an error between the output sentence 160 and the true sentence. The natural language processing model training device 100 may then train the word embedding 120, the encoder 130, and the decoder 150 to decrease the first loss.

The natural language processing model training device 100 may train the natural language processing model through the first loss, and train the natural language processing model also through a second loss. For example, the natural language processing model training device 100 may train the natural language processing model through the first loss and the second loss using a multitask learning method. The training based on the second loss will be described hereinafter with reference to FIG. 2.

Hereinafter, a knowledge graph (KG) and a knowledge embedding vector will be described before describing the second loss-based training.

A KG may represent a relation among a plurality of entities or nodes. A KG embedding method may represent a relation with an entity in a KG as a vector (i.e., knowledge embedding vector). That is, a knowledge embedding vector may include information of a corresponding entity and a corresponding relation. For example, there may be a KG that represents a relationship between various entities (e.g., "Mona Lisa," "Da Vinci," etc.) and neighboring entities, and the entity "Mona Lisa" and the entity "Da Vinci" may have a relation indicating "painted." In this example, the KG embedding method may generate a knowledge embedding vector corresponding to "Mona Lisa" from the KG. The generated knowledge embedding vector corresponding to "Mona Lisa" may include information of "Da Vinci" (i.e., entity) and information of "painted" (i.e., relation). Here, the information of "Da Vinci" may correspond to the entity as an element in an entity space E, while the information of "painted" may correspond to an edge as an element of a relation space R, e.g., using TransE and Trans R.

Thus, as only an example, TransE and TransR may be used as the KG embedding method, but examples of the KG embedding method are not limited thereto.

Referring to FIG. 2, the natural language processing model training device 100 may determine or generate a knowledge embedding vector_true 210 and a knowledge embedding vector_false 220. The knowledge embedding vector_true 210 may be a vector that represents a true knowledge of the input sentence 110 or a knowledge relevant to the input sentence 110. The knowledge embedding vector_false 220 may be a vector that represents a false knowledge of the input sentence 110 or a knowledge determined irrelevant to the input sentence 110.

For example, the input sentence 110 may include a name of a person A. In such an example, the natural language processing model training device 100 may already know a true knowledge about the person A including, for example, a hometown of the person A, a height of the person A, and the like, through a KG, noting that examples are not limited to such knowledge graph relation representing approaches. The natural language processing model training device 100 may determine or generate the knowledge embedding vector_true 210 associated with the true knowledge of the person A through the KG embedding method, for example. The natural language processing model training device 100 may be already provided or otherwise know the true knowledge about the person A, and thus the natural language processing model training device 100 may generate a false knowledge about the person A and determine or generate the knowledge embedding vector_false 220 associated with the false knowledge about the person A.

The natural language processing model training device 100 may generate a score_true indicating a relationship between the context embedding vector 140 and the knowledge embedding vector_true 210. As illustrated in FIG. 2, the natural language processing model training device 100 may generate the score_true indicating the relationship between the context embedding vector 140 and the knowledge embedding vector_true 210 using a score function 170.

As a non-limiting example, the score function 170 may be a neural network including a plurality of fully-connected layers. The score function 170 (e.g., the neural network) may be trained to represent a relationship between a first vector and a second vector as a score, in a case in which the example neural network receives, as an input, a concatenated vector that is generated by concatenating the first vector and the second vector. For example, the natural language processing model training device 100 may generate a first concatenated vector by concatenating the context embedding vector 140 and the knowledge embedding vector_true 210, and input the generated first concatenated vector to the score function 170. In response to the first concatenated vector being input, the score function 170 may generate the score_true indicating the relation between the context embedding vector 140 and the knowledge embedding vector_true 210.

The natural language processing model training device 100 may generate a score_false indicating a relation between the context embedding vector 140 and the knowledge embedding vector_false 220. As illustrated in FIG. 2, the natural language processing model training device 100 may generate the score_false indicating the relation between the context embedding vector 140 and the knowledge embedding vector_false 220 also using the score function 170. The foregoing description of the score_true is applicable to the description of the score_false, and thus a more detailed and repeated description of the score_false will be omitted here for brevity.

The natural language processing model training device 100 may determine a second loss through a second loss function defined based on a difference between the score_true and the score_false. For example, the natural language processing model training device 100 may determine the second loss based on "the score_false—the score_true." As described above, the natural language processing model training device 100 may train the natural language processing model to decrease a first loss. Similar to this, the natural language processing model training device 100 may train the natural language processing model to decrease the second loss. That is, the natural language processing model training device 100 may train the word embedding 120 and the encoder 130 to decrease the second loss. A decrease in the second loss may indicate that the relation between the context embedding vector 140 and the knowledge embedding vector_true 210 increases. Thus, the natural language processing model training device 100 may include the knowledge information associated with the input sentence 110 in the context embedding vector 140, and thus the natural language processing model training device 100 may train the word embedding 120 and the encoder 130 to decrease the second loss. Through such training, the knowledge information associated with the input sentence 110 may thereby be included or represented in each result of the word embedding 120 and the context embedding vector 140. In an example, the natural language processing model training device 100 may train the word embedding 120 and the encoder 130, e.g., without training the decoder 150, but examples are not limited thereto. In another example, the natural language processing model training device 100 may train the decoder 150 based on the second loss.

Figure 3:
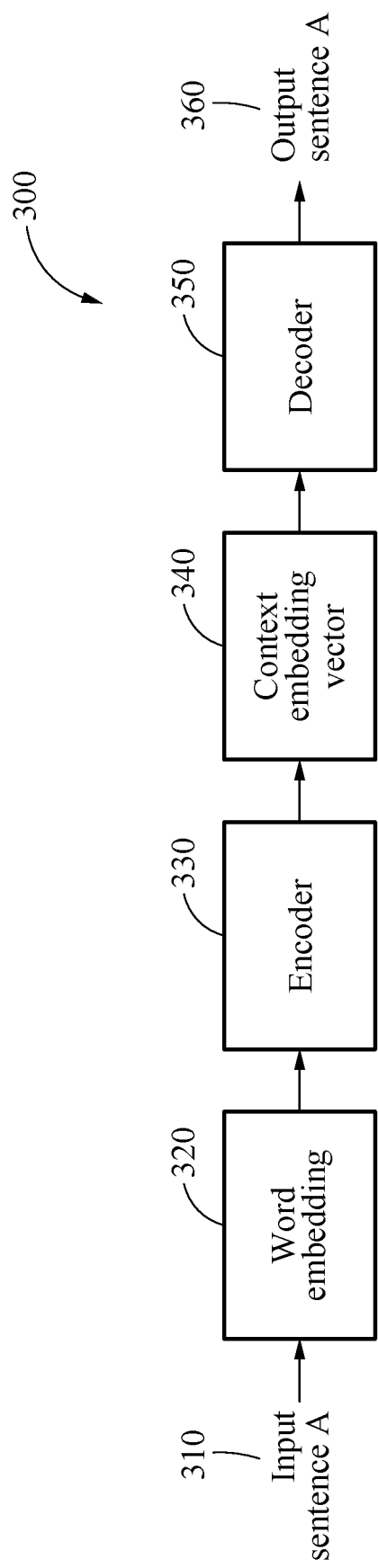
FIG. 3 illustrates an example operation of a natural language processing model in an inference process.

FIG. 3 illustrates an example operation of a natural language processing model in an inference process.

A natural language processing model to be described hereinafter with reference to FIG. 3 may be the trained natural language processing model trained as described above with reference to FIGS. 1 and 2 and as described further below. The natural language processing model to be described hereinafter with reference to FIG. 3 will be referred to as a model A for the convenience of description. The model A may be implemented by a computing device 300. An example computing device 300 will be described in greater detail with reference to FIG. 7.

The computing device 300 may perform word embedding 320 on an input sentence A 310.

The word embedding 320 may be trained such that knowledge information associated with a given input sentence is included in a result of the word embedding 320. Thus, the result of the word embedding 320 may include knowledge information of the input sentence A 310. That is, the result of the word embedding 320 may represent a word of the input sentence A 310 and the knowledge information.

The computing device 300 may generate a context embedding vector 340 by encoding the result of the word embedding 320 through an encoder 330. The encoder 330 may have been trained to generate a context embedding vector including knowledge information and a context of a given input information. Thus, the context embedding vector 340 may include a context of the input sentence A 310 and the knowledge information of the input sentence A 310. That is, the context embedding vector 340 may represent the context of the input sentence A 310 and the knowledge information of the input sentence A 310.

The computing device 300 may generate an output sentence A 360 by decoding the context embedding vector 340 through a decoder 350.

The model A may be used for an inference process that infers the knowledge information associated with the input sentence A 310, without receiving a separate input of the knowledge information associated with the input sentence A 310, e.g., without increasing a model parameter and computation quantity compared to typical natural language processing model that does not include such knowledge information based training of word embedding and/or encoder operations. Thus, the performance of the model A may be improved over such a typical natural language processing model implementations.

Figure 4:
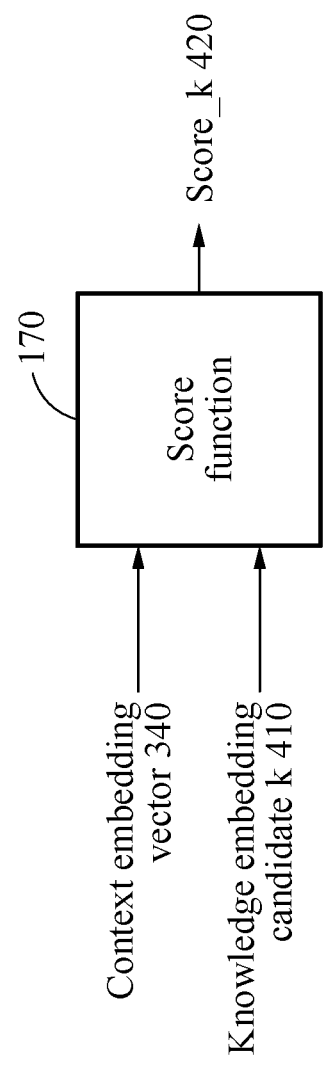
FIG. 4 illustrates an example determining of whether a relationship between a word embedding result and a knowledge embedding candidate exists in an example inference process.

FIG. 4 illustrates an example of determining whether a word embedding result and a knowledge embedding candidate have a relation in an inference process.

Referring to FIG. 4, the computing device 300 may extract an entity associated with an input sentence A using a KG embedding method.

The computing device 300 may input, to a score function 170, a context embedding vector 340 and a knowledge embedding candidate k 410 for which a relation with the input sentence A is to be determined.

The computing device 300 may generate a score_k 420 indicating a relation between the context embedding vector 340 and the knowledge embedding candidate k 410 through the score function 170.

When the score_k 420 is greater than or equal to a threshold value, the computing device 300 may verify that an entity corresponding to the knowledge embedding candidate k 410 is related to the input sentence A through the score_k 420.

Figure 5:
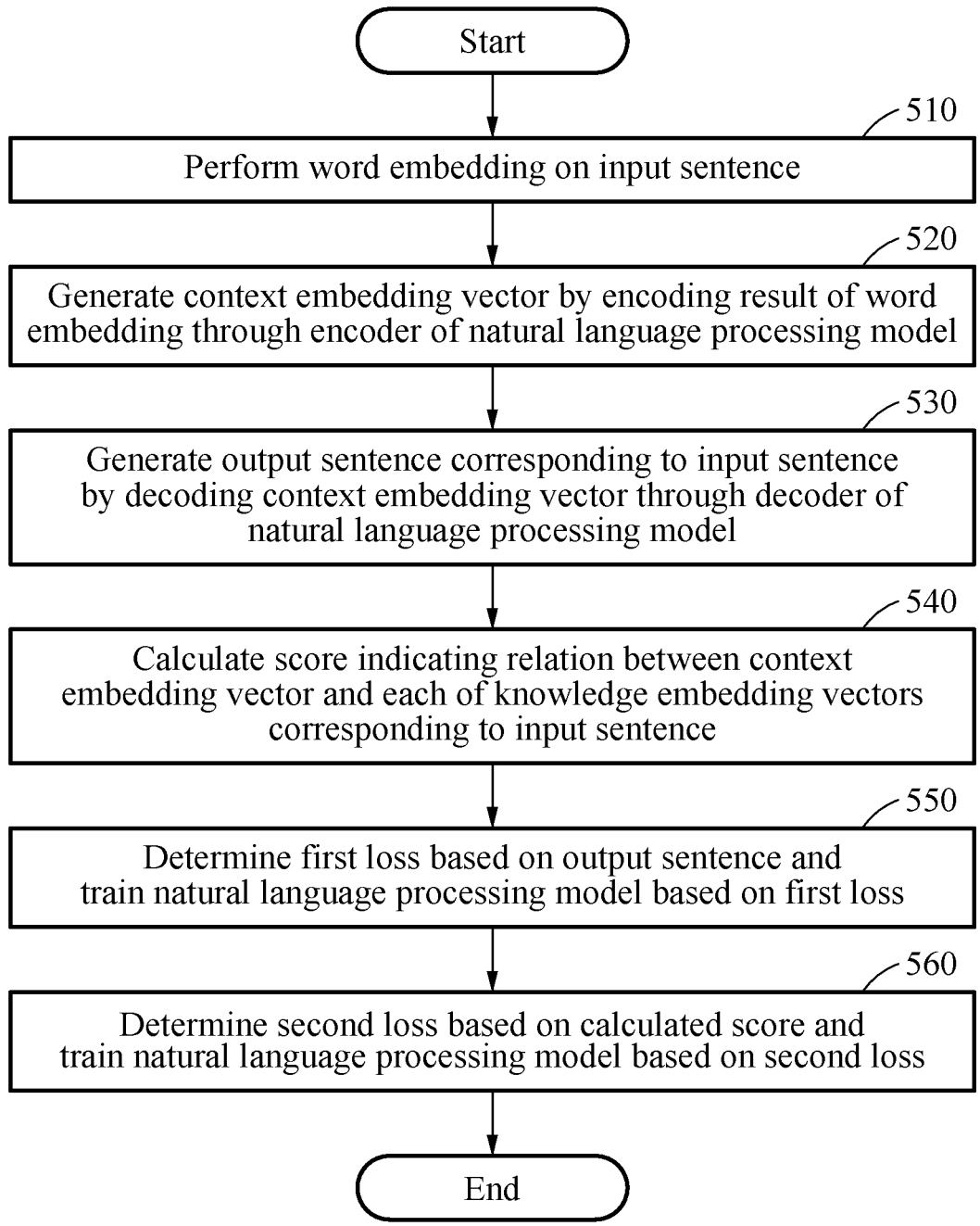
FIG. 5 illustrates a flowchart of an example natural language processing model training.

FIG. 5 illustrates a flowchart of an example natural language processing model training.

Referring to FIG. 5, in operation 510, a natural language processing model training device 100 performs the word embedding 120 on the input sentence 110.

In operation 520, the natural language processing model training device 100 generates the context embedding vector 140 by encoding a result of the word embedding 120 through the encoder 130 of the natural language processing model described above.

In operation 530, the natural language processing model training device 100 generates the output sentence 160 corresponding to the input sentence 110 by decoding the context embedding vector 140 through the decoder 150 of the natural language processing model.

In operation 540, the natural language processing model training device 100 generates a score indicating a relation between the context embedding vector 140 and each of a plurality of knowledge embedding vectors.

In operation 550, the natural language processing model training device 100 determines a first loss based on the output sentence 160 and trains the natural language processing model based on the determined first loss.

In operation 560, the natural language processing model training device 100 determines a second loss based on scores obtained through the generation operations in operation 540 and trains the natural language processing model based on the determined second loss. In an example, operation 560 may be performed after operation 550, but examples are not limited thereto.

Additional detailed descriptions of the operations of FIG. 5 are available with the above descriptions with reference to FIGS. 1 through 4, and thus a repeated description will be omitted here for brevity.

Figure 6:
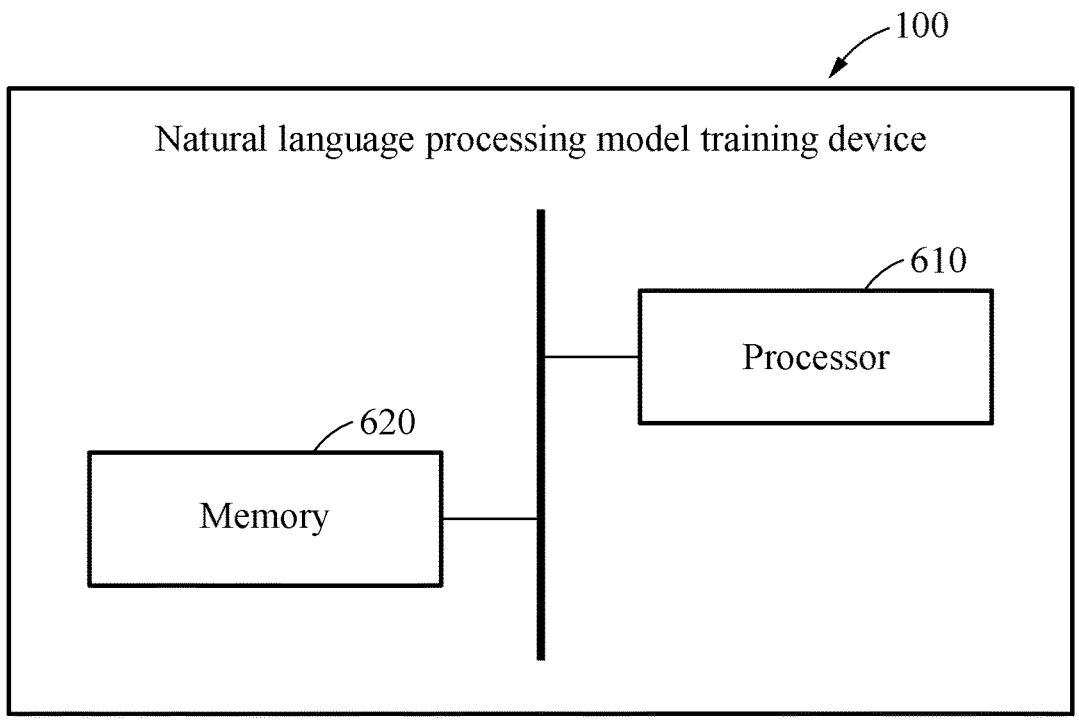
FIG. 6 illustrates an example natural language processing model training device.

FIG. 6 illustrates an example natural language processing model training device.

Referring to FIG. 6, the natural language processing model training device 100 includes a processor 610 and a memory 620, as a non-limiting example.

The memory 620 may store a natural language processing model, e.g., initial parameter information of the natural language processing model, and the processor 610 may train the natural language processing model through a multitask learning method. For example, the initial parameter information of the natural language processing model may be initialized parameter information or pre-trained or otherwise trained parameter information for the natural language processing model.

The processor 610 may perform the word embedding 120 on a training input sentence 110.

The processor 610 may generate the context embedding vector 140 by encoding a result of the word embedding 120 through the encoder 130 of the natural language processing model.

The processor 610 may generate the output sentence 160 corresponding to the input sentence 110 by decoding the context embedding vector 140 through the decoder 150 of the natural language processing model.

The processor 610 may determine a first loss based on the output sentence 160 and train the natural language processing model based on the determined first loss. As described above, the processor 610 may train the natural language processing model to decrease the first loss.

The processor 610 may generate a score indicating a relation between the context embedding vector 140 and each of plural knowledge embedding vectors. For example, the processor 610 may generate a first score indicating a relation between the context embedding vector 140 and a first knowledge embedding vector, and generate a second score indicating a relation between the context embedding vector 140 and a second knowledge embedding vector. In this example, the first knowledge embedding vector may correspond to a knowledge embedding vector that represents a true knowledge of the input sentence 110, and the second knowledge embedding vector may correspond to a knowledge embedding vector that represents a false knowledge of the input sentence 110.

The processor 610 may determine a second loss based on the generated score for each of the knowledge embedding vectors and train the natural language processing model based on the determined second loss. For example, the processor 610 may determine the second loss using a difference between the first score and the second score and train the word embedding 120 and the encoder 130 based on the second loss. That is, the processor 610 may train the word embedding 120 such that knowledge information associated with the input sentence 110 is included in a result of the word embedding 120 for the training input sentence 110, and train the encoder 130 such that the knowledge information associated with the input sentence 110 is included in the context embedding vector 140. The first and second losses may be determined based on a same input of the training input sentence 110 to the natural language processing model for training the natural language processing model using both losses, e.g., using the aforementioned multi-task learning method, as a non-limiting example.

Additional available detailed description of the natural language processing model training device 100 is provided above with reference to FIGS. 1 through 5, and thus a repeated description will be omitted here for brevity.

Figure 7:
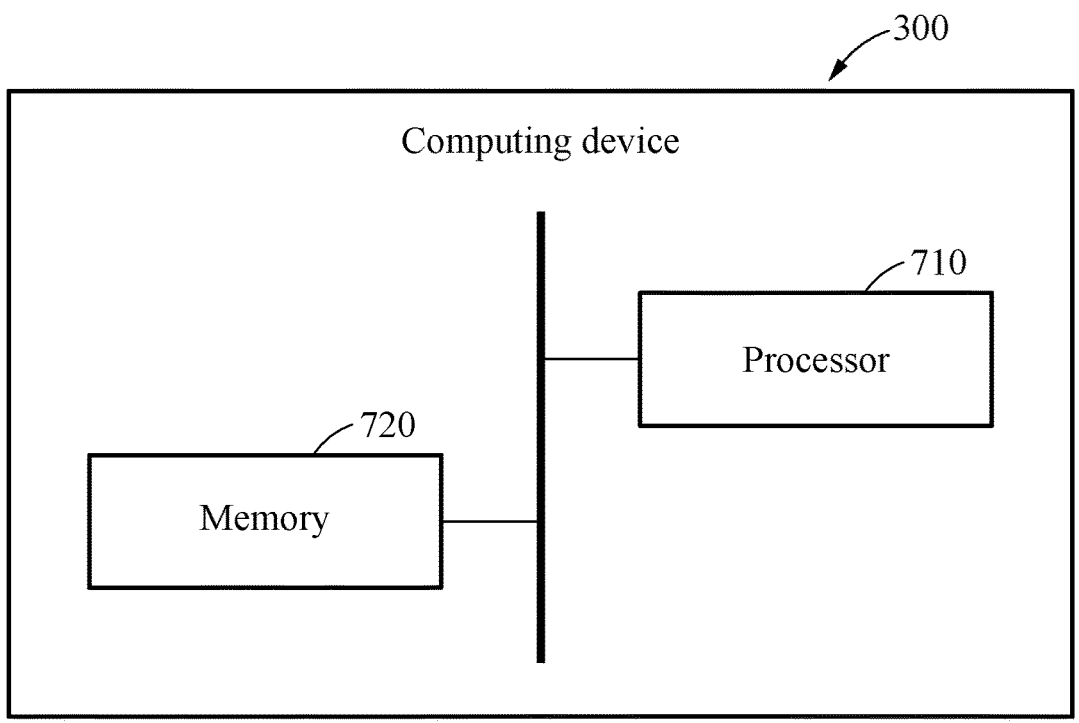
FIG. 7 illustrates an example computing device.

FIG. 7 illustrates an example computing device.

Referring to FIG. 7, the computing device 300 includes a processor 710 and a memory 720.

The computing device 300 may also be referred to as a data processing device, an electronic apparatus, an electronic device, and the like.

The computing device 300 may be a mobile terminal, such as, for example, a mobile phone and a tablet personal computer (PC).

The memory 720 may store a natural language processing model, e.g., various parameters of a trained natural language processing model. The natural language processing model may be one that is trained as described above with reference to FIGS. 1-2 and 4-6.

The processor 710 may correspond to a neural processing unit (NPU), but examples are not limited thereto.

The processor 710 may implement the natural language processing model with respect to an input sentence 310.

As described above with reference to FIG. 3, the processor 710 may perform the word embedding 320 on the input sentence 310. As described above, trained knowledge information associated with the input sentence 310 may be included in a result of the word embedding 320.

The processor 710 may generate the context embedding vector 340 by encoding the result of the word embedding 320 through the encoder 330. As described above, the trained knowledge information associated with the input sentence 310 may also be included in the context embedding vector 340.

The processor 710 may generate the output sentence 360 corresponding to the input sentence 310 by decoding the context embedding vector 340 through the decoder 350.

The illustrated computing device 300 is also representative of an included input interface, display, and communication interface of the computing device 300.

The input interface may be an interface configured to receive an input from a user and may include a microphone, for example. The microphone may receive an uttered speech of the user, and the processor 710 may convert the received speech to the input sentence 310.

The display may display a result of operations of the processor 710. For example, the display may display the output sentence 360 under the control of the processor 710.

The communication interface may include, for example, a mobile communication (e.g., 3G, 4G, 5G, etc.) module, a short-range wireless communication (e.g., Bluetooth) module, and a wireless local area network (LAN) communication (e.g., WiFi) module. The computing device 300 may communicate with an external device, for example, a server, through the communication interface.

Additional available detailed description of the training of the natural language processing model and implementations of the trained natural language processing model is provided above with reference to FIGS. 1 through 6, and thus a repeated description will be omitted here for brevity.

In another example, the computing device 300 may be included in a server that is configured to be capable to process massive amounts of data efficiently. Such an example will be described hereinafter with reference to FIG. 8.

Figure 8:
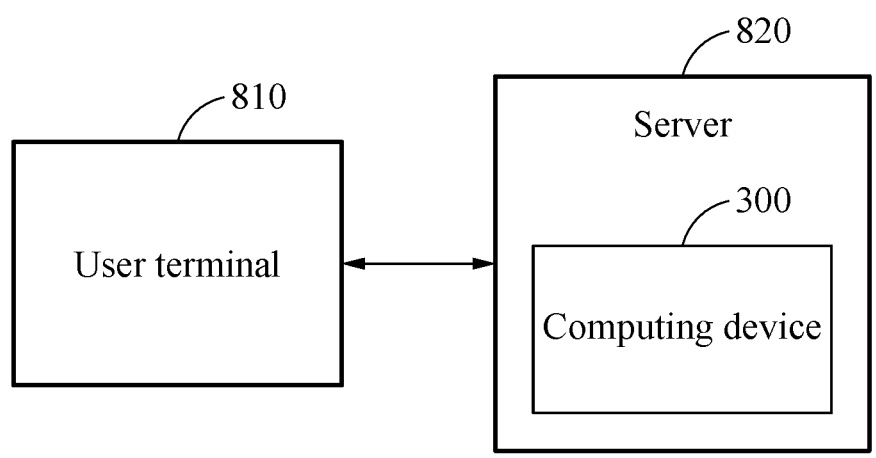
FIG. 8 illustrates an example natural language processing system.

FIG. 8 illustrates an example natural language processing system.

Referring to FIG. 8, the computing device 300 may be included in a server 820, as a non-limiting example.

For example, the natural language processing system illustrated in FIG. 8 may be a conversation system, a question responding system, a chatbot system, or a personal assistant system, as non-limiting examples.

A user may utter a voice or speech, and a user terminal 810 may then receive the uttered speech through a microphone and generate a speech signal.

The user terminal 810 may transmit the speech signal to the server 820.

The server 820 may convert the speech signal to a sentence or a text. For example, the server 820 may convert the speech signal to the sentence or the text through a speech recognition engine.

The computing device 300 may receive the sentence as an input from the server 820, and generate an output sentence corresponding to the input sentence by implementing the natural language processing model described above.

The server 820 may transmit the output sentence to the user terminal 810. Alternatively, the server 820 may perform an operation corresponding to the output sentence and transmit a result of performing the operation to the user terminal 810. Additionally, while the above describes an example interaction between the server 820 and the user terminal 810, where some operations may be performed by the server 820 and some operations may be performed by the user terminal 810, examples are not limited to these example sharing of operations and one or more of these shared operations may be variously performed by either of the server 820 and user terminal 810, in various embodiments.

Additional available detailed description of the implementation of the trained natural language processing model is provided above with reference to FIGS. 1 through 7, and thus a more detailed and repeated description will be omitted here for brevity. For example, while FIGS. 7 and 8 describe implementations of trained natural language processing models, either or both of FIGS. 7 and 8 may also include the processors or various system devices thereof also being configured to perform training with respect to a user of a user terminal, for example.

The word embedding, encoders, context embedding vector generators, decoders, score functions, natural language processing model training devices, memories, processors, user terminals, servers, computing devices, and other devices, apparatuses, units, modules, and components described herein with respect to FIGS. 1-8 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method, the method comprising:
    performing a word embedding of an input sentence;
    encoding a result of the word embedding, using an encoder of a natural language processing model, to generate a context embedding vector;
    decoding the context embedding vector, using a decoder of the natural language processing model, to generate an output sentence corresponding to the input sentence;
    generating a first score based on a relation between the context embedding vector and a set true or relevant knowledge embedding vector; and
    generating a second score based on a relation between the context embedding vector and a set false or irrelevant knowledge embedding vector;
    determining a first loss based on the output sentence;
    determining a second loss based on the generated first score and the generated second score; and
    performing training of the natural language processing model, including:
        training the natural language processing model based on the determined first loss; and
        training the natural language processing model based on the determined second loss.

2. The method of claim 1,
    wherein the set true or relevant knowledge embedding vector is a predetermined, generated, or determined true or relevant knowledge embedding vector with respect to the input sentence, and
    wherein the set false or irrelevant knowledge embedding vector is a generated or determined false or irrelevant knowledge embedding vector with respect to the input sentence.

3. The method of claim 1, wherein the training of the natural language processing model based on the second loss comprises:
    determining the second loss using a difference between the first score and the second score; and
    training the word embedding and the encoder based on the second loss.

4. The method of claim 3, wherein the training of the word embedding and the encoder is performed to decrease the second loss.

5. The method of claim 1,
    wherein the generating of the first score comprises:
        generating a first concatenated vector by concatenating the context embedding vector and the set true or relevant knowledge embedding vector; and
        generating the first score using the first concatenated vector and a score function, and
    wherein the generating of the second score comprises:
        generating a second concatenated vector by concatenating the context embedding vector and the set false or irrelevant knowledge embedding vector; and
        generating the second score using the second concatenated vector and the score function.

6. The method of claim 5, wherein the score function is a neural network comprising a plurality of fully-connected layers.

7. The method of claim 1, wherein the training of the natural language processing model based on the second loss comprises:
    training the word embedding to include knowledge information associated with the input sentence in results of the word embedding, and
    training the encoder to includes sentence context information and respective knowledge information in context embedding vector results of the encoder.

8. The method of claim 1, further comprising:
    generating the knowledge embedding vectors using knowledge graph (KG) embedding.

9. The method of claim 1,
    wherein the training of the natural language processing model based on the determined first loss includes training the word embedding, the encoder, and the decoder based on the first loss, and
    wherein the training of the natural language processing model based on the determined second loss includes training the word embedding and the encoder based on the second loss.

10. A non-transitory computer-readable storage medium storing instructions, which when executed by a processor, configure the processor to perform the method of claim 1.

11. A device, the device comprising:
    a memory storing a natural language processing model; and
    a processor configured to:
        perform a word embedding of an input sentence;
        encode a result of the word embedding, using an encoder of the natural language processing model, to generate a context embedding vector;
        decode the context embedding vector, using a decoder of the natural language processing model, to generate an output sentence corresponding to the input sentence;
        generate a first score based on a relation between the context embedding vector and a set true or relevant knowledge embedding vector;
        generate a second score based on a relation between the context embedding vector and a set false or irrelevant knowledge embedding vector;
        determine a first loss based on the output sentence;
        determine a second loss based on the generated first score and the generated second score; and
        perform a training of the natural language processing model, including:
            a training of the natural language processing model based on the determined first loss; and
            a training of the natural language processing model based on the determined second loss.

12. The device of claim 11, wherein the set true or relevant knowledge embedding vector is a predetermined, generated, or determined true or relevant knowledge embedding vector with respect to the input sentence, and
    wherein the set false or irrelevant knowledge embedding vector is a generated or determined false or irrelevant knowledge embedding vector with respect to the input sentence.

13. The device of claim 11, wherein the processor is configured to:
  determine the second loss using a difference between the first score and the second score; and
  train the word embedding and the encoder based on the second loss.

14. The device of claim 11, wherein the processor is configured to:
  generate a first concatenated vector by concatenating the context embedding vector and the set true or relevant knowledge embedding vector, and generate the first score using the first concatenated vector and a score function; and
  generate a second concatenated vector by concatenating the context embedding vector and the set false or irrelevant knowledge embedding vector, and generate the second score using the second concatenated vector and the score function.

15. The device of claim 14, wherein the score function is a neural network comprising a plurality of fully-connected layers.

16. The device of claim 11, wherein the processor is configured to:
  train the word embedding to include knowledge information associated with the input sentence results of the word embedding; and
  train the encoder to include sentence context information and respective knowledge information in context embedding vector results of the encoder.

17. The device of claim 11, wherein the processor is configured to:
  generate the knowledge embedding vectors using knowledge graph (KG) embedding.

* * * * *